United States Patent
Thubert et al.

(10) Patent No.: US 8,085,686 B2
(45) Date of Patent: Dec. 27, 2011

(54) AGGREGATION AND PROPAGATION OF SENSOR DATA WITHIN NEIGHBOR DISCOVERY MESSAGES IN A TREE-BASED AD HOC NETWORK

(75) Inventors: Pascal Thubert, La Colle Sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 1087 days.

(21) Appl. No.: 11/862,845

(22) Filed: Sep. 27, 2007

(65) Prior Publication Data
US 2009/0085769 A1    Apr. 2, 2009

(51) Int. Cl.
H04L 12/28 (2006.01)
H04W 4/00 (2009.01)

(52) U.S. Cl. .................. 370/254; 370/338; 370/408

(58) Field of Classification Search .................. None
See application file for complete search history.

(56) References Cited

U.S. PATENT DOCUMENTS

| | | | |
|---|---|---|---|
| 6,912,586 B1 | 6/2005 | Achtermann et al. | |
| 7,020,086 B2 | 3/2006 | Juttner et al. | |
| 7,035,240 B1 * | 4/2006 | Balakrishnan et al. | 370/338 |
| 7,151,769 B2 | 12/2006 | Stanforth et al. | |
| 7,203,175 B2 | 4/2007 | Thubert et al. | |
| 7,251,570 B2 | 7/2007 | Hancock et al. | |
| 7,430,205 B2 | 9/2008 | Ota et al. | |
| 7,558,195 B1 | 7/2009 | Kuo et al. | |
| 7,769,848 B2 | 8/2010 | Choy et al. | |
| 7,941,188 B2 | 5/2011 | Jung et al. | |
| 2002/0090949 A1 | 7/2002 | Stanforth | |
| 2003/0026268 A1 | 2/2003 | Navas | |
| 2004/0039840 A1 | 2/2004 | Dispensa et al. | |
| 2004/0134336 A1 | 7/2004 | Solomon | |
| 2005/0041598 A1 | 2/2005 | Cho et al. | |
| 2005/0076054 A1 | 4/2005 | Moon et al. | |
| 2005/0157698 A1 | 7/2005 | Park et al. | |
| 2005/0226201 A1 | 10/2005 | McMillin | |
| 2005/0265259 A1 * | 12/2005 | Thubert et al. | 370/255 |
| 2006/0133363 A1 | 6/2006 | Dumet et al. | |
| 2006/0215698 A1 | 9/2006 | Hamdan | |
| 2006/0248197 A1 | 11/2006 | Evans et al. | |

(Continued)

OTHER PUBLICATIONS

Yarvis, et al; "Real-World Experiences with an Interactive Ad Hoc Sensor Network"; 2002; IEEE Computer Society; 9 pages.*

(Continued)

Primary Examiner — Robert Scheibel
(74) Attorney, Agent, or Firm — Leon R. Turkevich

(57) ABSTRACT

In one embodiment, a method comprises attaching, by a mobile router, to an attachment router according to a protocol requiring establishment of a tree topology having a single clusterhead, the attaching by the mobile router based on the mobile router receiving, from the attachment router, an advertisement message specifying an attachment prefix; outputting a second advertisement message specifying availability of a prescribed address prefix used by the mobile router, and further specifying attributes of the mobile router relative to the tree topology; receiving a plurality of sensor data messages from at least one attached sensor host node, each sensor data message specifying at least one sensor data element specifying a detected sensor parameter; aggregating the sensor data elements from the sensor data messages into aggregated sensor data; and generating and outputting a neighbor advertisement message to the attachment router, the neighbor advertisement message specifying the aggregated sensor data.

17 Claims, 6 Drawing Sheets

U.S. PATENT DOCUMENTS

| | | | |
|---|---|---|---|
| 2006/0291404 | A1 | 12/2006 | Thubert et al. |
| 2007/0088225 | A1 | 4/2007 | Tanaka et al. |
| 2007/0127459 | A1 | 6/2007 | Lo et al. |
| 2007/0153707 | A1 | 7/2007 | Thubert et al. |
| 2007/0198675 | A1 | 8/2007 | Amanuddin et al. |
| 2008/0094205 | A1 | 4/2008 | Thorn |
| 2008/0168440 | A1 | 7/2008 | Regnier et al. |
| 2008/0259919 | A1* | 10/2008 | Monga .......................... 370/389 |
| 2009/0016215 | A1* | 1/2009 | Nadas et al. .................. 370/230 |
| 2009/0080370 | A1 | 3/2009 | Patel et al. |
| 2010/0125584 | A1 | 5/2010 | Navas |

OTHER PUBLICATIONS

"6loWPAN", [online], [retrieved on Sep. 19, 2007]. Retrieved from the Internet: <URL: http://en.wikipedia.org.w.index.php?title=6loWPAN&printable=yes>, pp. 1-3, August 2007.

Govindan et al., "The Sensor Network as a Database", preprint, [online] (2002). Retrieved from the Internet: <URL: http://citeseer.ist.psu.edu/govindan02sensor.html>, pp. 1-8.

"Korea's KT Deploys Wireless Mesh Weather Forecasting Network", [online], [retrieved on Aug. 15, 2007]. Retrieved from the Internet: <URL: http://wireless.sensorsmag.com/sensorswireless/article/articleDetail.jsp?...>, pp. 1-3, Dec. 2006.

Narten et al., "Neighbor Discovery for IP Version 6 (IPv6)", Network Working Group, Request for Comments: 2461, Dec. 1998, pp. 1-93.

Arkko et al., "SEcure Neighbor Discovery (SEND)", Network Working Group, Request for Comments: 3971, Mar. 2005, pp. 1-56.

"Routing Protocols for Sensor Networks", [online], [retrieved on Jul. 27, 2007]. Retrieved from the Internet: <URL:http://nms.csail.mit.edu/projects/leach/>, pp. 1-2.

Popoviciu et al., "Deploying IPv6 Networks", Cisco Press, Indianapolis, IN, ISBN 1587052105, Nov. 2006, , pp. 308-309.

"Technical Overview of Time Synchronized Mesh Protocol (TSMP)", [online], (Document Date Unknown) Dust Networks, [retrieved on Aug. 17, 2007]. Retrieved from the Internet: <URL: http://www.dustnetworks.com/docs/TSMP_Whitepaper.pdf>, pp. 1-18, Jun. 2006.

Dey, "Low-cost, Reliable Data Aggregation Techniques for Wireless Sensor Networks", ECE Department, University of California, San Diego, [online], [retrieved on Sep. 19, 2007]. Retrieved from the Internet: <http://esdat.ucsd.edu/projects/relSens/CWC2003_shoubhik.pdf>, pp. 1-5, 2003.

Heinzelman et al., "Energy-Efficient Communication Protocol for Wireless Microsensor Networks", Proceedings of the Hawaii International Conference on System Sciences, Jan. 4-7, 2000, IEEE, pp. 1-10.

Mukhopadhyay et al., "Low-cost, Reliable Data Aggregation Techniques for Wireless Sensor Networks", [online], Aug. 5, 2003 [retrieved on Sep. 19, 2007]. Retrieved from the Internet: <URL: http://esdat.ucsd.edu/projects/relSens/CWC2003_shoubhik.pdf>, pp. 1-5.

Wikipedia, "IS-IS", [online], Sep. 13, 2007 [retrieved on Sep. 20, 2007]. Retrieved from the Internet: <URL:http://en.wikipedia.org/w/index.php?title=IS-IS&printable=yes>, pp. 1-3.

Wikipedia, "Open Shortest Path First", [online], Sep. 20, 2007 [retrieved on Sep. 20, 2007]. Retrieved from the Internet: <URL: http://en.wikipedia.org/w/index.php?title=Open_Shortest_Path_First&printable=yes>, pp. 1-9.

Wikipedia, "Routing Table", [online], Sep. 16, 2007 [retrieved on Sep. 29, 2007]. Retrieved from the Internet: <URL: http://en.wikipedia.org/w/index.php?title=Routing_table&printable=yes>, pp. 1-3.

Heinzelman et al, "Adaptive Protocols for Information Dissemination in Wireless Sensor Networks", [online] Fifth ACM/IEEE MOBICOM Conference, Seattle, WA, Aug. 1999, [retrieved on Aug. 22, 2007]. Retrieved from the Internet: <URL: http://wind.lcs.mit.edu/papers/spin-mobicom99.ps>pp. 1-12.

\* cited by examiner

AGGREGATION AND PROPAGATION OF SENSOR DATA WITHIN NEIGHBOR DISCOVERY MESSAGES IN A TREE-BASED AD HOC NETWORK

TECHNICAL FIELD

The present disclosure generally relates to sensor networks, for example mesh networks or ad hoc networks that transport data packets carrying sensor data from sensor host nodes.

BACKGROUND

Sensor networks enable sensor data from remote sensors to be transported within data packets to a destination controller, for example an executable application configured for monitoring the sensor data. The remote sensors (e.g., video cameras, weather sensors, etc.) can be implemented as sensor host nodes configured for forming a wireless mesh network configured for reaching the destination controller. Sensor networks can be deployed on a large scale that covers a large geographic area (e.g., a wireless mesh weather forecasting network), or a smaller scale that relies on centimeter-sized (or smaller) sensor host nodes, also referred to as "sensor dust". Smaller sensor host nodes such as the "sensor dust" have limited battery life, however, and therefore are limited in their ability in relaying data packets from other sensor host nodes throughout the wireless mesh network. Mobile routers also can be deployed to form the mesh network, enabling the sensor host nodes to be implemented for example as wireless IPv6 host nodes. Hence, the mobile routers forming the mesh network serve as default gateways for the sensor host nodes, enabling transport of the data packets transmitted by the sensor host nodes and carrying the sensor data to the destination controller via the mesh network.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
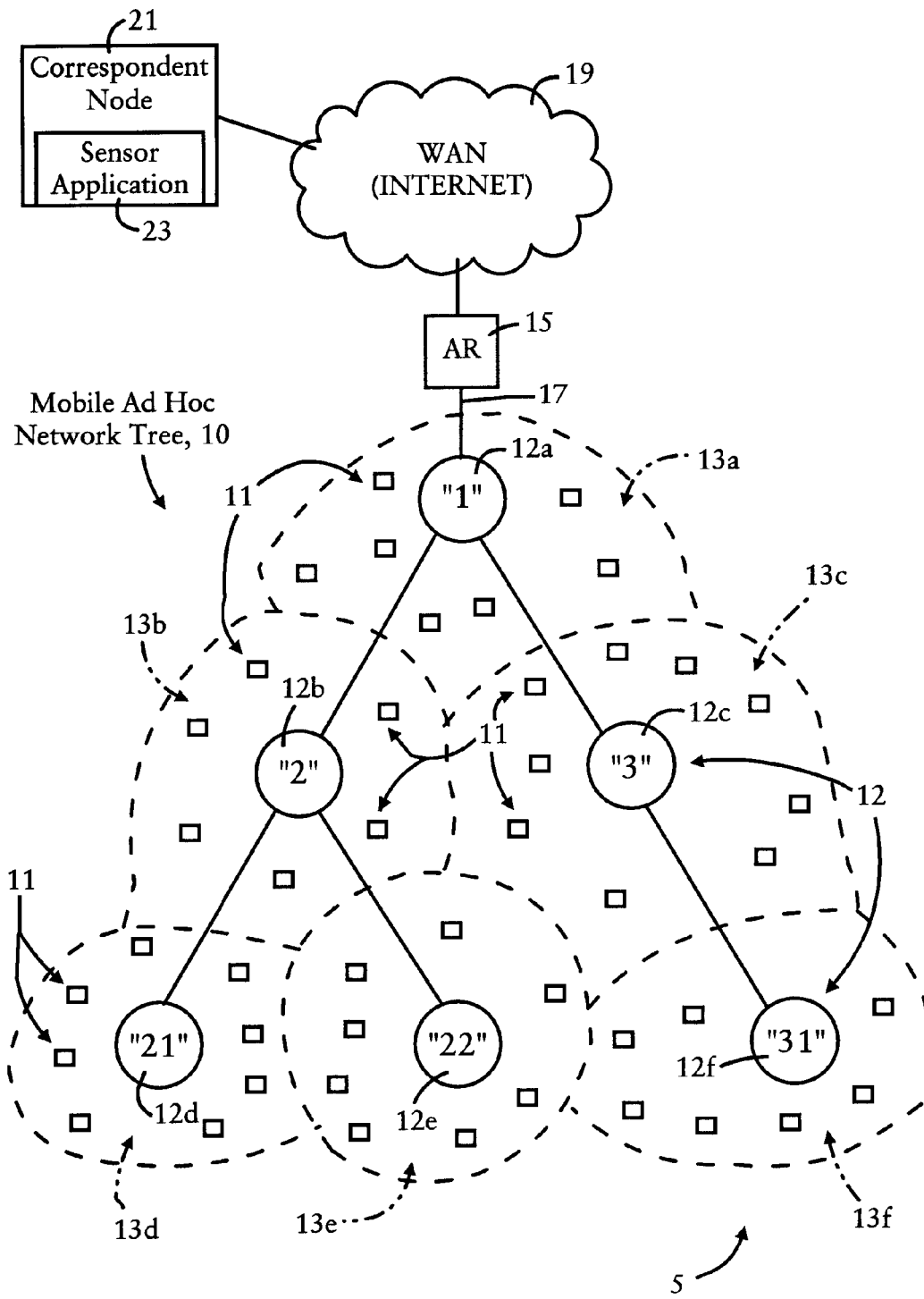
FIG. 1 illustrates an example system having mobile routers configured for aggregating sensor data received from sensor host notes, and forwarding the aggregated sensor data to a clusterhead of a tree-based ad hoc mobile network, according to an example embodiment.

In one embodiment, a method comprises attaching, by a mobile router, to an attachment router according to a protocol requiring establishment of a tree topology having a single clusterhead, the attaching by the mobile router based on the mobile router receiving, from the attachment router, an advertisement message specifying an attachment prefix; outputting by the mobile router a second advertisement message specifying availability of a prescribed address prefix used by the mobile router and distinct from the attachment prefix, and further specifying attributes of the mobile router relative to the tree topology; receiving by the mobile router a plurality of sensor data messages from at least one attached sensor host node, each sensor data message specifying at least one sensor data element specifying a detected sensor parameter; aggregating by the mobile router the sensor data elements from the sensor data messages into aggregated sensor data; and generating and outputting by the mobile router a neighbor advertisement message to the attachment router, the neighbor advertisement message specifying the aggregated sensor data.

In another embodiment, an apparatus comprises an Internet Protocol (IP) interface circuit and a second circuit. The IP interface circuit is configured for receiving an advertisement message that specifies an attachment prefix from an attachment router. The IP interface circuit further is configured for outputting a second advertisement message specifying availability of a prescribed address prefix used by the apparatus and distinct from the attachment prefix. The IP interface circuit further is configured for receiving a plurality of sensor data messages from at least one attached sensor host node, each sensor data message specifying at least one sensor data element specifying a detected sensor parameter. The second circuit is configured for attaching to the attachment router according to a protocol requiring establishment of a tree topology having a single clusterhead. The second circuit further is configured for generating the second advertisement message to specify attributes of the apparatus relative to the tree topology. The second circuit further is configured for generating the second advertisement message in response to attachment to the attachment router. The second circuit further is configured for aggregating the sensor data elements from the sensor data messages into aggregated sensor data, and generating, for output by the IP interface circuit, a neighbor advertisement message to the attachment router and that specifies the aggregated sensor data.

DETAILED DESCRIPTION

Particular embodiments enable mobile routers to establish a wireless ad hoc mobile network having a tree-based topology, and output neighbor advertisement messages toward the root (i.e., clusterhead) of the tree-based topology. The neighbor advertisement messages can specify aggregated network prefix reachability information, as described in commonly-assigned US Patent Publication No. 2005/0265259, published Dec. 1, 2005, entitled "ARRANGEMENT FOR PROVIDING NETWORK PREFIX INFORMATION FROM ATTACHED MOBILE ROUTERS TO A CLUSTERHEAD IN A TREE-BASED AD HOC MOBILE NETWORK". The neighbor advertisement messages also can specify aggregated sensor data based on an aggregation of received sensor data messages from attached sensor host nodes. If a given mobile router is an intermediate mobile router that serves as a default attachment router for at least one attached mobile router, the intermediate mobile router can generate its aggregated sensor data based on an aggregation of the received sensor data messages from attached sensor host nodes, plus received aggregated sensor data retrieved by the intermediate mobile router from a received neighbor advertisement message.

Hence, the mobile routers can propagate aggregated sensor data toward the clusterhead using neighbor advertisement messages that are relied upon for propagation of network reachability information within the tree-based ad hoc mobile network. Consequently, wireless network traffic can be dramatically reduced by multiple orders of magnitude based on implementing a tree-based wireless ad hoc mobile network: the tree-based wireless ad hoc mobile network enables each sensor host node to send its sensor data to a single attachment mobile router, eliminating the necessity of relaying data packets from sensor host nodes throughout a mesh network. Further, aggregation of sensor data by each mobile router can minimize data traffic for sensor data based on adding the aggregated sensor data within neighbor advertisement messages that are required for maintaining reachability within the tree-based wireless ad hoc mobile network, eliminating the necessity of continuous transport of data packets carrying sensor data from sensor host nodes throughout the tree-based wireless ad hoc mobile network. As described below, additional information can be added to the aggregated sensor data, including statistical information about the aggregated sensor data (e.g., number of sensor data elements aggregated, sum of the sensor data elements, mean or median of the sensor data elements, standard deviation of the sensor data elements, etc.), and/or categorizing the aggregated sensor data based on sensor attribute types, where statistics can be segregated based on the sensor attribute type (e.g., temperature, air pressure, water pressure, photoreceptor, chemoreceptor, position/GPS value, velocity, acceleration, acoustic values, etc.).

FIG. 1 is a diagram illustrating an example system 5 having a mobile ad hoc network 10 having been established by mobile routers 12 for reception of sensor data messages from attached sensor host nodes 11 (illustrated in FIG. 1 as squares within the mobile ad hoc network 10), according to an example embodiment. The mobile routers 12 (e.g., 12a, 12b, 12c, 12d, 12e, and 12f) establish the mobile ad hoc network 10 according to a protocol requiring establishment of a tree topology having a single clusterhead, as described for example in commonly-assigned U.S. Pat. No. 7,428,221, published as U.S. Patent Publication No. 2005/0265259, described in further detail below with respect to FIG. 2. Each host sensor node 11 can be configured for attaching to a single mobile router according to prescribed attachment requirements, for example, the mobile router 12 providing the strongest or most reliable wireless IEEE 802.11 link, such that all host sensor host nodes 11 within a corresponding region (e.g., 13a, 13b, 13c, 13d, 13e, or 13f) will attach to a corresponding mobile router (e.g., 12d).

The clusterhead (e.g., mobile router 12a) can be configured for attaching to an access router 15 providing access to the wide area network 19 via an available link 17 (e.g., a wired IEEE 802.3 or wireless 802.11 link), enabling a remote correspondent node 21 executing a sensor application 23 to receive aggregated sensor data, described below, via the wide area network 19. The clusterhead 12a also can be configured to not require any attachment to any attachment router 17 if the correspondent node 21 is attached to one of the mobile routers 12 within the mobile ad hoc network 10, in which case the mobile ad hoc network 10 can be a floating tree, as described in commonly-assigned U.S. Pat. No. 7,203,175, published Feb. 19, 2004 as Application Publication US 2004/0032852 A1, entitled "ARRANGEMENT FOR ROUTER ATTACHMENTS BETWEEN ROAMING MOBILE ROUTERS IN A MOBILE NETWORK".

As described in detail below, each mobile router 12 can be configured to not forward sensor data messages received from attached sensor host nodes 11, such that each mobile router 12 can block any forwarding of a sensor data message received from a sensor host node 11. Rather, each mobile router 12 can be configured for aggregating sensor data elements specified within the sensor data messages, where each sensor data element specifies a detected sensor parameter. Each mobile router (e.g., 12d) also can be configured for generating and outputting a neighbor advertisement message to its corresponding attachment router (e.g., 12b) that can include the aggregated sensor data, described below with respect to FIG. 4.

Hence, each of the mobile routers 12 can be configured for blocking transfer of received sensor data messages, and forwarding aggregated sensor data toward the clusterhead 12a only in response to a prescribed event that necessitates transmission of a neighbor advertisement message, improving efficiency in the network 10 by replacing the transfer of sensor data messages with neighbor advertisement messages carrying aggregated sensor data. Further, use of the tree topology ensures that each sensor host node 11 attaches to one and only one mobile router 12 at a time, ensuring that duplicate packets are not received and propagated into the mobile ad hoc network tree 10 by multiple mobile routers 12.

A description will first be provided of the formation of the tree topology 10 by the mobile routers 12, followed by a description of the aggregation of sensor data according to the example embodiments.

Figure 2:
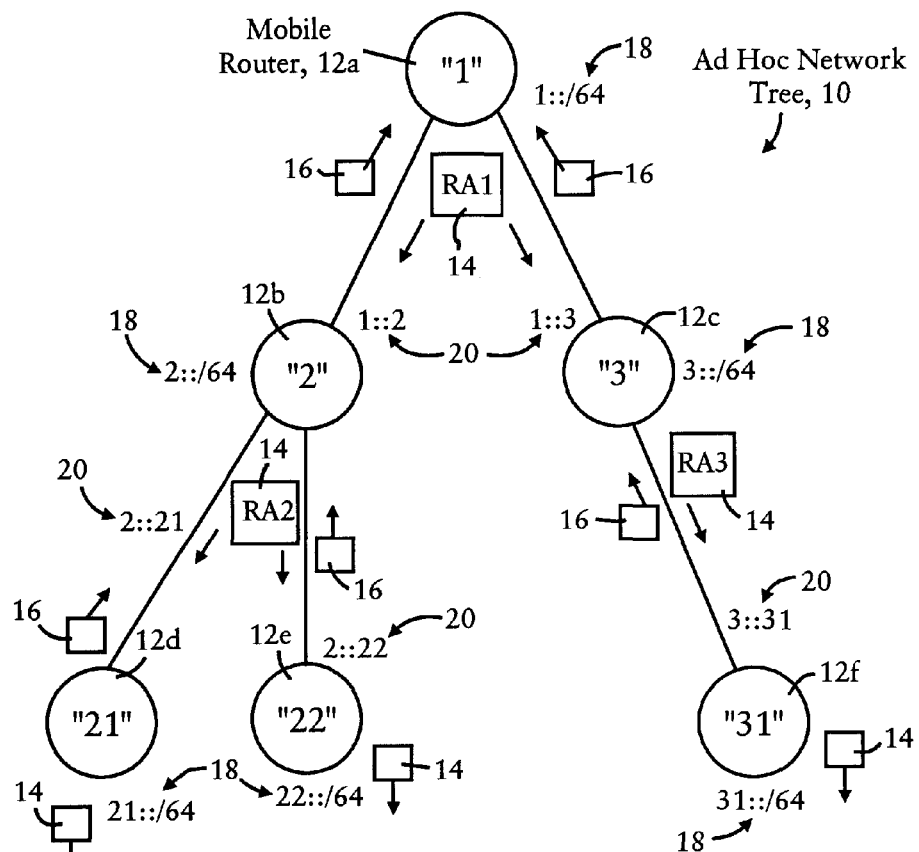
FIG. 2 illustrates the tree-based ad hoc mobile network of FIG. 1 and formed by the mobile routers of FIG. 1, according to an example embodiment.

FIG. 2 illustrates in further detail the example ad hoc network tree 10 according to an example embodiment. Each mobile router 12 can serve as an attached mobile router and/or an attachment mobile router. Each router 12 can be configured for outputting a router advertisement message 14, illustrated in FIG. 3, that specifies a prescribed address prefix 18 used by the mobile router 12. Each attached mobile router (e.g., 12b, 12c, 12d, 12e, and 12f) can be configured for attaching to one of the attachment routers (e.g., 12a, 12b, 12c) in response to received advertisement messages by selecting a default attachment address 20, and in compliance with a protocol requiring establishment of a tree topology having a single clusterhead. Note that the address prefix (e.g., "1::/64") 18 used by a mobile router (e.g., 12a) refers to the address prefix used by the mobile router 18 in creating and maintaining an addressable subnet for routing of data packets to nodes connected to ingress interface circuitry of the mobile router 18; as illustrated below with respect to FIG. 5, a mobile router 18 can include entries (e.g., routing table entries, neighbor cache entries) for routing packets within the subnet specified by the address prefix used by the mobile router 18.

According to an example embodiment, the tree topology illustrated in the mobile ad hoc network 10 is relied upon in minimizing the amount of routing information needed to be transferred among mobile routers, and minimizing the transfer of sensor data. In particular, a tree topology having a single clusterhead 12a inherently has no loops. Since the tree topology 10 inherently has no loops, attached mobile routers can be configured to provide no more than the minimum routing information necessary for an attached mobile router to identify network address prefixes that are reachable via an attached mobile node. Further, sensor host nodes 11 can be configured to send messages (e.g., sensor data messages) only to their current attachment router; hence, all sensor host nodes 11 within the region 13d can be configured to attach only to the mobile router 12d and send sensor data messages only to the corresponding attachment mobile router 12d (e.g., by using the mobile router unicast address 25), ensuring that no other nearby mobile router (e.g., 12b or 12e) will automatically forward any sensor data message that is not specifically addressed to that nearby mobile router.

Attached mobile routers (e.g., 12b, 12c, 12d, 12e, 12f) can identify themselves to an attachment mobile router (e.g., 12a) by sending neighbor advertisement messages 16 that specify a network-in-node option, namely that a network node has at least one network address prefix. As described below with respect to FIG. 4, the network-in-node option 22 can specify to the attachment mobile router (e.g., 12a) no more than that a given network prefix 18 (e.g., 2::/64 of mobile router "2" 12b) is reachable via a default attachment address 20 (e.g., 1::2) within the address space of the address prefix 18 of the attachment router (i.e., the attachment prefix). As described below with respect to FIG. 4, the neighbor advertisement message also can include an aggregated sensor data option 27 that specifies aggregated sensor data.

Hence, a neighbor advertisement message 16 from the attached mobile router 12b can be detected by the attachment mobile router 12a to specify merely that the network prefix "2::/64" 18 is reachable via the address "1::2" 20 which is within the address realm (i.e., address space) of the attachment prefix "1::/64" 18 used by the attachment mobile router 12a. Note that no further routing information (e.g., hop count, home address of a node, topology information, source routing information, link state information, etc.) needs to be sent to the attachment router 12a, since the attachment mobile router only needs to be aware of address prefixes of attached mobile routers. The mobile routers 12 can be configured for routing a packet specifying an unknown destination to its default attachment router; hence, the packet is routed toward the clusterhead 12a until a mobile router can identify the destination address relative to an identified network prefix 18.

Hence, the example embodiment provides an efficient proactive routing protocol for ad hoc networks that minimizes the necessity of bandwidth and processing requirements to accommodate rapid topology changes by providing rapid convergence.

The mobile routers 12 can dynamically assemble layer 2 clusters into a tree-based topology model 10 as illustrated in FIG. 1 using the attachment techniques described for example in the above-identified U.S. Pat. No. 7,203,175. The ad hoc network 10 can be organized into a tree-based topology cluster, where the clusterhead (i.e., a root of a tree) 12a can be determined by having the highest relative preference metric visible to other mobile routers. Preference metric can be based on an explicit preference value, described below, or based on a tree depth identifier indicating the relative position of the mobile router relative to the clusterhead; in other words, tree depth indicates the number of hops to the clusterhead. A mobile router can associate with the router advertisement (RA) originator by storing the information in the RA message in its default router list, and selecting the source of the RA message as its attachment router.

Hence, the mobile routers 12b through 12f can choose an attachment router based on preference metrics specified in received router advertisement messages 14. As illustrated in FIG. 2, the mobile routers 12b and 12c, in response to detecting the unsolicited router advertisement message ("RA1") 14, can add the RA1 message 14 to their internal default router list memory circuitry 55, illustrated in FIG. 5. The mobile routers 12b through 12f also can choose an attachment router based on identifying an attachment router having closest matching preferences, as described in copending, commonly-assigned U.S. Patent Application Publication No. 2007/0153707, published Jul. 5, 2007, entitled "Ad Hoc Network Formation and Management Based on Aggregation of Ad Hoc Nodes According to an Aggregation Hierarchy".

Figure 3:
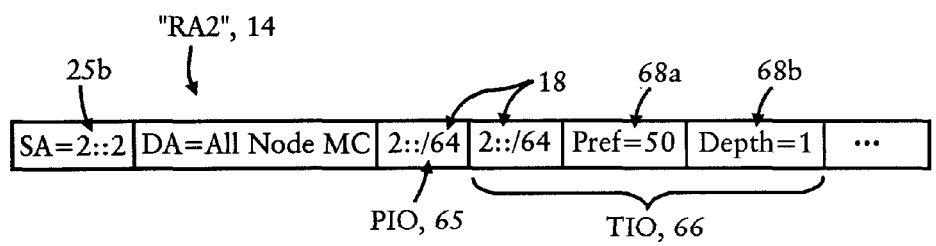
FIG. 3 illustrates an example router advertisement message, according to an example embodiment.

FIG. 3 illustrates an example router advertisement message 14 output by the mobile router 12b. As illustrated in FIG. 3, each router advertisement message 14 can specify a prefix information option (PIO) 65 for address autoconfiguration in accordance with the Internet Engineering Task Force (IETF) Request for Comments (RFC) 2461, and/or a tree information option (TIO) field 66. The TIO can specify an available address prefix 18 used by the mobile router 12, and attributes 68 of the mobile router 12b relative to the tree topology 10. For example, the tree information option field 66 can specify the network prefix 18b, a preference value 68a, and/or a tree depth 68b. The preference field 68a can be configured for storing a preference value for the mobile router 12b as stored in a corresponding preference register (not shown), enabling a mobile router receiving the RA message 14 to decide whether to associate with the source of the RA message 14. The tree depth field 68b can be configured for storing the depth of the mobile router 12 within the tree (i.e., the number of hops to the clusterhead), enabling other routers receiving the RA message 14 to determine the relative position of the router advertisement originator within the tree 10. The mobile routers 12d and 12e can select the mobile router 12b as their attachment router based on a specified preference metric (e.g., preference value, mobile router 12a advertised as a clusterhead, etc.).

Figure 5:
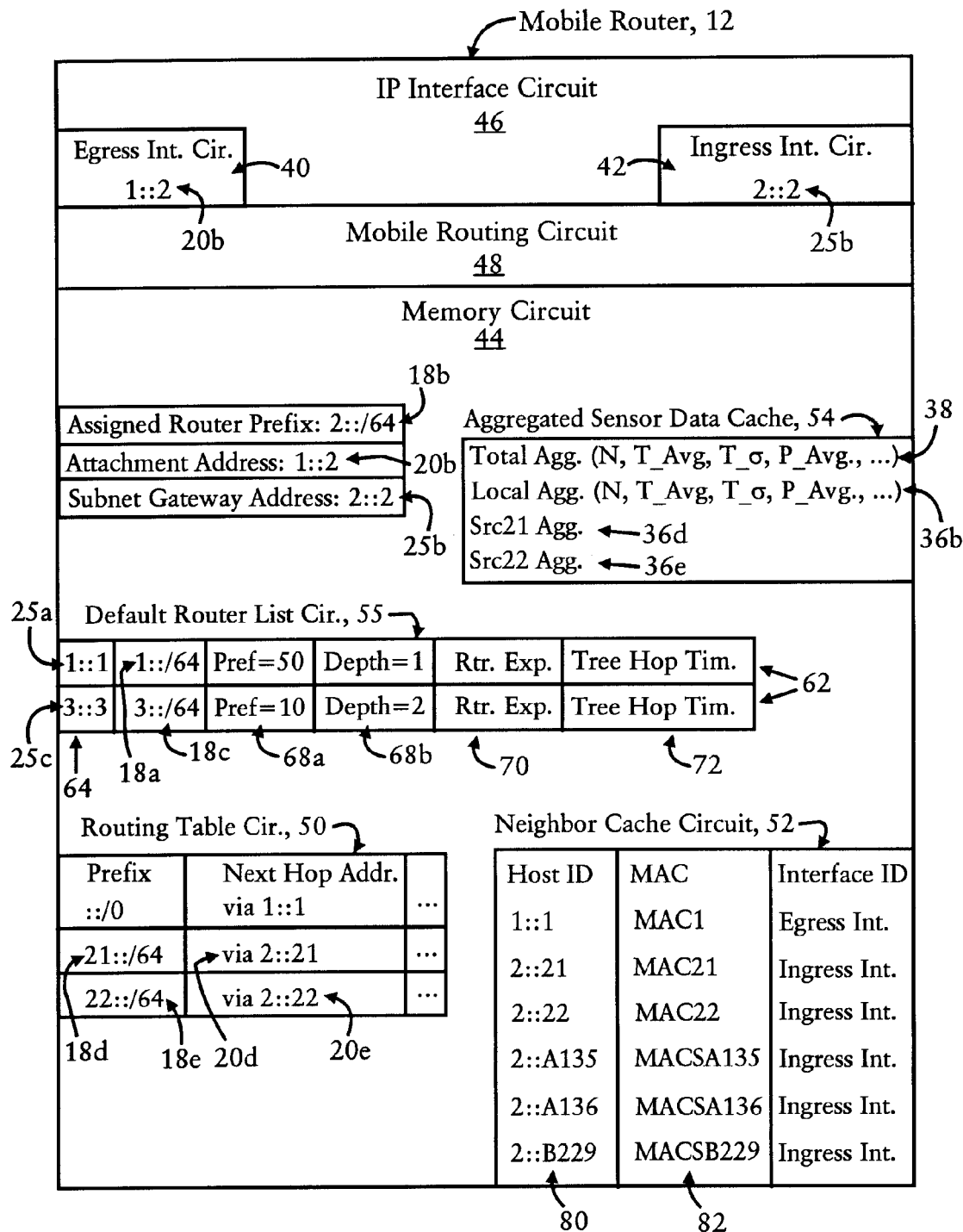
FIG. 5 illustrates an example mobile router, according to an example embodiment.

For example, the mobile router 12b, illustrated in detail in FIG. 5, can create and store in its memory circuit 44 a default attachment address ("1::2") 20 for use on its egress interface circuit 40 that is within the address space of the address prefix "1::/64" 18 advertised by the clusterhead 12a; the mobile router 12b also can add an entry in its routing table that specifies that the address prefix "1::/64" is reachable via the default attachment address "1::2" 20. Similarly, the mobile router 12c can create a default attachment address ("1::3") 20 on its egress interface that is within the address space of the address prefix "1::/64" 18 advertised by the clusterhead 12a; the mobile router 12c also can add an entry in its routing table that specifies that the address prefix "1::/64" is reachable via the default attachment interface having been assigned the default attachment address "1::3".

The mobile routers 12b and 12c can begin outputting respective router advertisement messages "RA2" and "RA3" 14 on their respective IPv6 ingress interface circuits 42, advertising their respective address prefixes 18 ("2::/64" and "3::/64"), and the tree depth/preference based on the clusterhead 12a being the top level mobile router. As described above, any unknown address can be sent by a mobile router 12 using its default attachment address to an attachment router; hence, the router advertisement messages "RA2" and "RA3" 14 need not specify the address prefix "1::/64" of the clusterhead 12a, since all attached mobile routers (e.g., 12d, 12e, 12f) can forward unknown destinations by default to the mobile routers 12b or 12c.

The mobile routers 12d and 12e having the respective network prefixes 18 ("21::/64" and "22::/64") can attach to the mobile router 12b as their attachment router by selecting respective default attachment addresses 20 ("2::21" and "2::

22") from within the address space ("2::/64") 18 of the attachment router 12*b*. Similarly, the mobile router 12*f* can attach to the mobile router 12*c* by selecting a default attachment address ("3::31") 20 from the address space ("3::/64") 18 of the attachment router 12*c*. The routers 12*d*, 12*e*, and 12*f* in turn can output their own router advertisement messages advertising their respective address prefixes ("21::/64", "22::/64", and "31::/64") 18 enabling any network node (host 11 or router 12) to attach based on the corresponding router advertisement message 14. The router advertisement messages also can be implemented according to RFC 3971, entitled "SEcure Neighbor Discovery (SEND)".

Hence, the mobile routers 12 can form a tree topology 10 based on selectively attaching to a mobile router 12 having transmitted a router advertisement message 14 with a TIO 66. As apparent from the foregoing, each sensor host nodes 11 also can attach to one of the mobile routers 12 based on receiving the corresponding router advertising message 14.

Assuming that no other information has been output into the network 10 other than the router advertisement messages 14, each mobile router only knows its default route toward the clusterhead 12*a*. In other words, none of the mobile routers 12 have any information related to any attachment nodes away from the clusterhead. In contrast to all the mobile routers 12 registering with the clusterhead 12*a* to provide the clusterhead 12*a* with the source route path to all the prefixes 18, the clusterhead 12*a* simply needs to know which attachment address (e.g., 1:2 or 1:3) 20 should be used to reach the identified prefix 18.

Hence, each attached mobile router 12 can send to its attachment router a neighbor advertisement message 16 specifying that the prescribed address prefix used by the mobile router 12, and any address prefixes stored internally from received neighbor advertisement messages received by the attached mobile router from other mobile routers, are reachable via the default attachment address used by the mobile router 12. Both the neighbor advertisement messages 16 and the router advertisement messages 14 can be implemented according to the SEND protocol as specified in RFC 3971. Further, since each attached router 12 can be configured for sending a neighbor advertisement message 16 to its default attachment router, each attached router 12 also can add aggregated sensor data to each neighbor advertisement message 16, enabling the propagation of aggregated sensor data toward the clusterhead with no increase in traffic (as measured by the number of messages sent).

Figure 4:
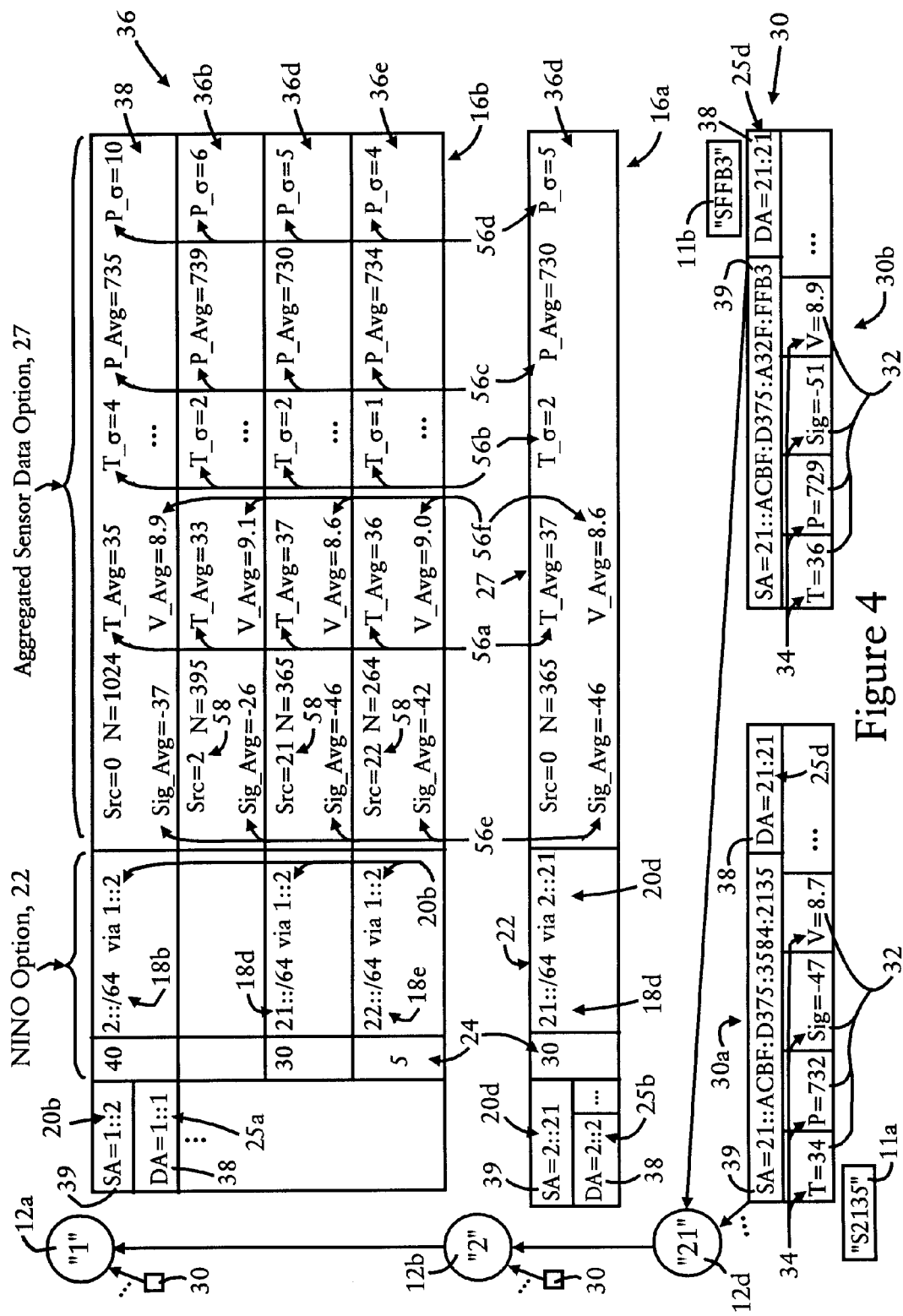
FIG. 4 illustrates example neighbor advertisement messages generated by the mobile routers of FIGS. 1 and 2 and including aggregated network prefix reachability information and aggregated sensor data, according to an example embodiment.

FIG. 4 is a diagram illustrating successive neighbor advertisement messages 16*a* and 16*b* output by the respective mobile routers 12*d* and 12*b* based on having attached to an attachment router according to the tree topology 10 of FIG. 1. As illustrated in FIG. 4, the mobile router 12*d* can receive sensor data messages 30*a*, 30*b* from respective sensor host nodes 11*a* and 11*b*. Each sensor data message (e.g., 30*a*) can include multiple sensor data elements 32 specifying respective detected sensor parameters 34, for example temperature ("T" in Celsius), atmospheric pressure ("P" in torr), wireless network signal level ("Sig" in dBm), sensor host node battery level ("V" in volts), etc.

In response to receiving the sensor data messages 30*a* and 30*b*, the mobile router 12*d* can be configured for blocking further transfer of the sensor data messages 30*a* and 30*b*, and instead aggregate the sensor data elements 32 into locally aggregated sensor data 36. Example aggregated sensor data 36 can include the number (N) of sensor host nodes 11 having submitted sensor data messages (e.g., 30*a*), average temperature (T_Avg) 56*a*, temperature standard deviation (T_σ) 56*b*, average air pressure (P_Avg) 56*c*, air pressure standard deviation (P_σ) 56*d*, average wireless network signal level (Sig_Avg) 56*e*, and average sensor host node battery level voltage (V_Avg) 56*f*.

FIG. 5 illustrates an example mobile router (e.g., 12*b*) 12, according to an example embodiment. The mobile router 12 can include an IPv6 interface circuit 46, a mobile routing circuit 48, and a memory circuit 44.

Assuming the example mobile router 12 of FIG. 5 illustrates the mobile router 12*b*, the IP interface circuit 46 can include an egress interface circuit 40 that can be configured for sending and receiving messages to and from a default attachment router (e.g., 12*a*) using a default attachment address 20*b* having been selected by the mobile routing circuit 48 in response to a received router advertisement message 14 from the attachment router (e.g., 12*a*). For example, in response to the egress interface circuit 40 of the mobile router 12*b* receiving the router advertisement message "RA1" 14 from the mobile router 12*a*, the mobile routing circuit 48 can select a default attachment address (e.g., "1::2") 20*b* that is within the address space of the attachment prefix (e.g., "1::/64") 18*a* specified in the received router advertisement message "RA1" 14. The egress interface circuit 40 also can be configured for outputting to the attachment router (e.g., 12*a*) a neighbor advertisement message (e.g., 16*b* of FIG. 4)16 having been generated by the mobile routing circuit 48, described below, and that specifies the default attachment address (e.g., "1::2") 20*b* within the corresponding source address field 39.

The ingress interface circuit 42 can be configured for outputting router advertisement messages (e.g., "RA2") 14 having been generated by the mobile routing circuit 48, advertising the availability of a prescribed address prefix (e.g., "2::/64") 18*b* and a prescribed subnet gateway address (e.g., "2::2") 25*b* used by the ingress interface circuit 42. Hence, any attached mobile router (e.g., 12*d*) can send a neighbor advertisement message (e.g., 16*a* of FIG. 4) to the ingress interface circuit 42 of the mobile router (e.g., 12*b*) by specifying the corresponding subnet gateway address 25*b* within a destination address field 38 of the neighbor advertisement message (e.g., 16*a*). Similarly, any attached sensor host node 11 can send a sensor data message 30 to the ingress interface circuit 42 of the mobile router 12*b* based on specifying the corresponding subnet gateway address 25 within the destination address field 38 of the sensor data message 30. Hence, the ingress interface circuit 42 can be configured for receiving neighbor advertisement messages (e.g., 16*a* of FIG. 4) from the attached mobile routers 12, and sensor data messages 30 from attached sensor host nodes 11.

The mobile routing circuit 48 can be configured for performing all mobile router operations, including neighbor discovery operations (e.g., according to RFC 2461 and/or RFC 3971), processing received router advertisement messages (e.g., "RA1") 14 based on storing received router advertisement parameters into a default router list circuit 55, and attaching to the attachment router 12*a* according to a protocol requiring establishing a tree topology having a single clusterhead, based on selecting an attachment address ("1::2") 20*b* based on the received router advertisement message (e.g., "RA1") 14 and that is within the address space of the address prefix (e.g., "1::/64") 18*a* specified in the received router advertisement message (e.g., "RA1") 14. As described above, the mobile routing circuit 48 can select an attachment router, from among multiple advertising mobile routers 12, using the attachment techniques described for example in the above-identified U.S. Pat. No. 7,203,275 or U.S. Patent Application Publication No. 2007/0153707. The mobile routing circuit 48 also can be configured for generating router advertisement messages (e.g., "RA2") 14, illustrated in FIG. 3, specifying availability of the prescribed address prefix ("2::/64") 18*b* that is distinct from the attachment prefix ("1::/64") 18*a*, and further specifying attributes of the mobile router 12*b* relative to the tree topology 10, for example the depth 68*b* of the mobile router 12*b* within the tree 10, or an advertised preference 68*a* of joining the mobile router 12*b* within the mobile ad hoc network tree 10.

The mobile routing circuit 48 also can be configured for adding entries to the routing table circuit 50 and/or a neighbor cache circuit 52, based on received router advertisement messages 14 and/or neighbor advertisement messages 16, for example according to RFC 2461 and/or RFC 3971.

As described below, the mobile routing circuit 48 of the mobile router 12*b* also can be configured for generating a neighbor advertisement message 16*b*, illustrated in FIG. 4, that can specify a network in node option (NINO) 22, and/or an aggregated sensor data option 27. The mobile routing circuit 48 can generate the network in node option 22 based on storing reachability information for specified prefixes (e.g., "21::/64" 18*d*) from received neighbor advertisement messages (e.g., 16*a*) into the routing table circuit 50 in the memory circuit 44, and retrieving the reachability information from the routing table circuit 50 and the assigned router prefix 18*b* and attachment address 20*b* from the memory circuit 44. Hence, the mobile routing circuit 48 can specify within the network in node option 22 that the prefixes 18*b*, 18*c*, and 18*d* all are reachable via the default attachment address 20*b*.

The mobile routing circuit 48 also can be configured for aggregating the sensor data elements 32 from received sensor data messages 30 into locally aggregated sensor data 36, which can then be stored by the mobile routing circuit 48 into an aggregated sensor data cache 54 in the memory circuit 44. As illustrated in FIG. 4, the mobile router 12*d* can generate locally aggregated sensor data 36*d*, and the mobile router 12*b* can generate locally aggregated sensor data 36*b*.

As illustrated in FIG. 4, the mobile router 12*d* can output to its attachment router 12*b* the neighbor advertisement message 16*a* that includes the network in node option 22 and the aggregated sensor data option 27 specifying the locally aggregated sensor data 36*d* having been aggregated by the mobile router 12*d*. The mobile routing circuit 48 within the mobile router 12*b* also can be configured for storing received aggregated sensor data 36*d* and 36*e* into the aggregated sensor data cache 54 based on reception of the respective aggregated sensor data 36*d* and 36*e* from respective neighbor advertisement messages 16 output by the respective attached mobile routers 12*d* and 12*e*. Hence, the mobile routing circuit 48 can be configured for aggregating its locally aggregated sensor data 36*b* with the received aggregated sensor data 36*d* from the received neighbor advertisement message 16*a*, along with received aggregated sensor data 36*e* received from the attached mobile router 12*e* via another neighbor advertisement message, in order to form a total aggregated sensor data 38 which can then be cached by the mobile routing circuit 48 into the aggregated sensor data cache 54. Hence, the total aggregated sensor data 38 represents an aggregation of all sensor data within the subtree attached to the corresponding mobile router 12*b*, based on a combined aggregation of locally aggregated sensor data (e.g., 36*b*) with received aggregated sensor data (e.g., 36*d* and 36*e*) received from respective mobile routers (e.g., 12*d* and 12*e*). In addition, the mobile routing circuit 48 can aggregate the aggregated sensor data 36 and 38 as statistical data according to the respective sensor attribute types 56, for example average temperature 56*a*, standard temperature deviation 56*b*, average air pressure 56*c*, standard air pressure deviation 56*d*, average wireless networks signal strength 56*e*, or average sensor battery voltage 56*f*. The mobile routing circuit 48 also can add to the aggregated sensor data option source identifiers 58 that identify the mobile router having generated the locally aggregated sensor data 36, and a number value (N) that specifies the number of sensor host nodes having supplied sensor data messages within the corresponding aggregation.

Further, the mobile routing circuit 48 can be configured to block sensor data messages received from attached to sensor host nodes 11, ensuring that the mobile ad hoc network 10 is not flooded with sensor data messages. In contrast, the mobile routing circuit 48 can be configured to forward non-sensor data messages from IPv6 host nodes that are not sensor host nodes, or even non-sensor data messages from attached to sensor host nodes 11, enabling a sensor application 23 executed in a correspondent node 21 to remotely configure a specific sensor host node (e.g., 11*a*), and permitting the specific sensor host node 11*a* to return an acknowledgment packet back to the sensor application 23 following configuration of the sensor host node 11*a*.

Any of the disclosed circuits in the mobile routers 12(including the network interface circuit 46, the memory circuit 44, and the mobile routing circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 28) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 44 can be implemented, for example, using a nonvolatile memory such as a programmable read only memory (PROM) or an EPROM, and/or a volatile memory such as a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer). Any reference to "outputting a message" or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Also note that the memory circuit 44 can be implemented dynamically by the mobile routing circuit 48, for example based on memory address assignment and partitioning executed by the mobile routing circuit 48.

Figure 6:
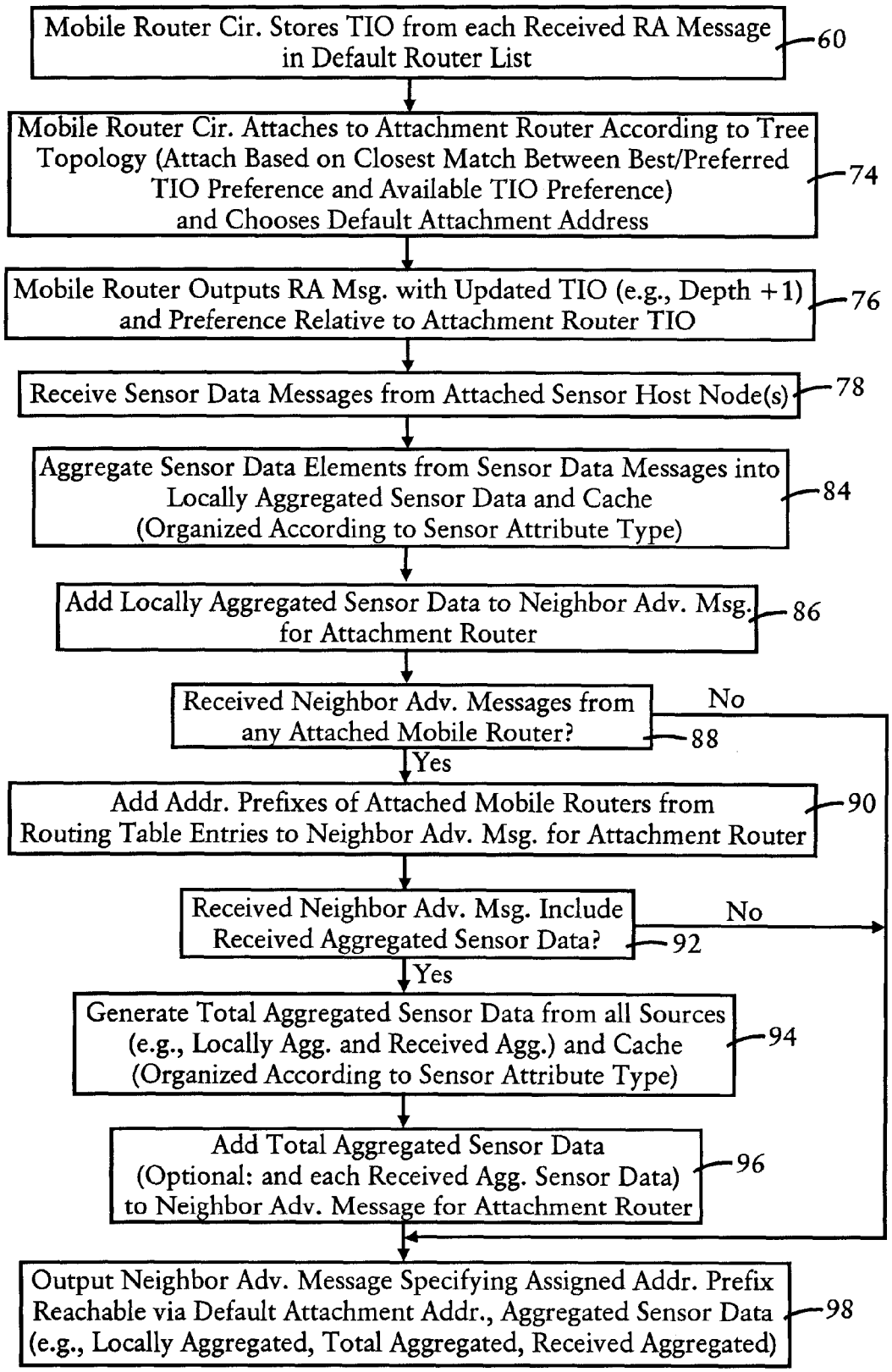
FIG. 6 illustrates an example method by the mobile router of FIG. 5 of generating and outputting, to a default attachment router, a neighbor advertisement message including aggregated network prefix reachability information and aggregated sensor data, according to an example embodiment.

FIG. 6 illustrates an example method by the mobile router of FIG. 5 of generating and outputting a neighbor advertisement message including aggregated network prefix reachability information and aggregated sensor data, according to an example embodiment. The steps described in FIGS. 6 and 7 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Figure 7:
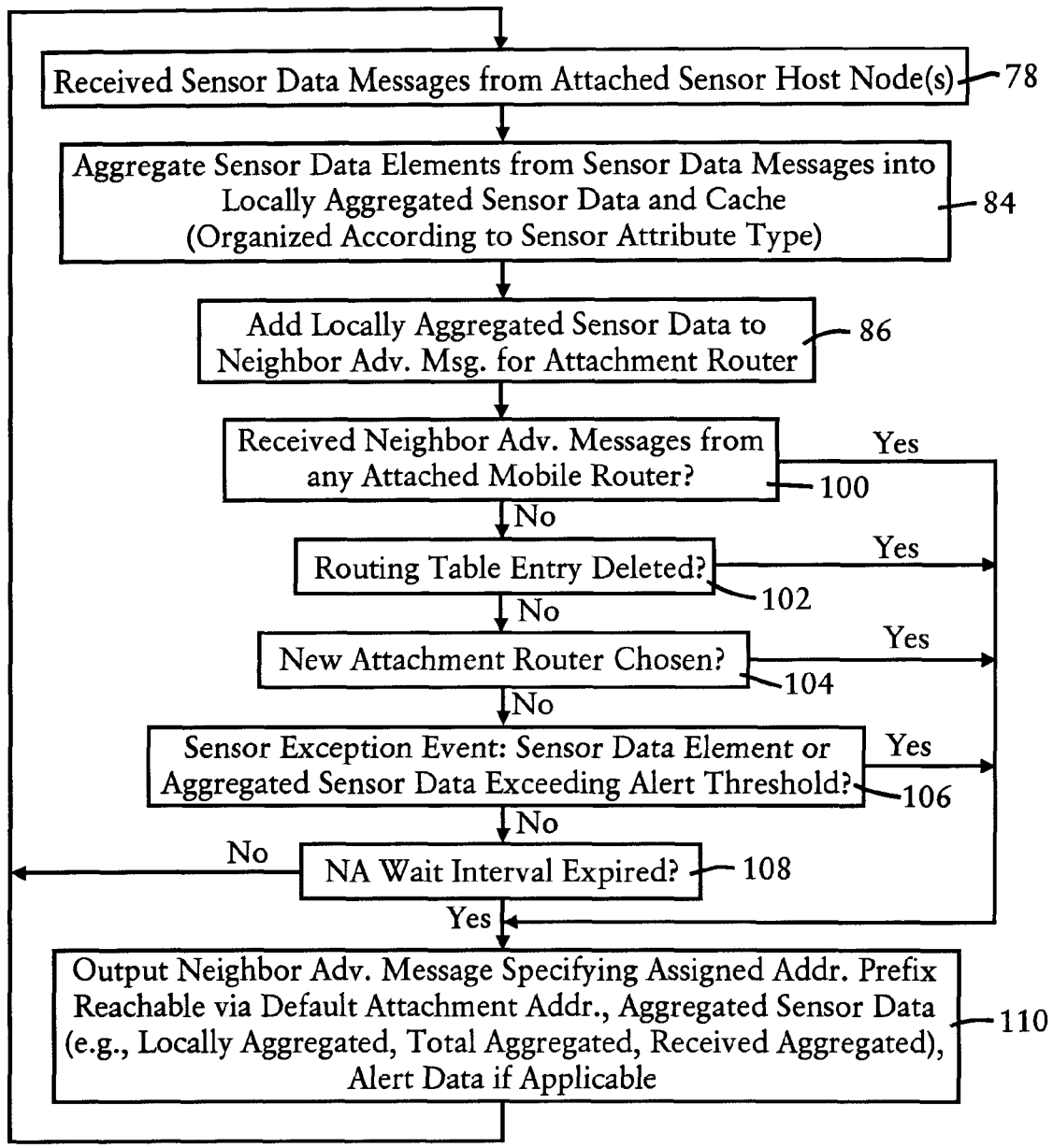
FIG. 7 illustrates an example method by the mobile router of FIG. 5 of generating and outputting updated neighbor advertisement messages, according to an example embodiment.

It also should be noted that the steps illustrated in FIGS. 6 and 7 illustrative in nature only: for example, many of the steps illustrated in Figures six and seven can be executed asynchronously, and do not need to be executed sequentially.

The mobile routing circuit 48 (e.g., within the mobile router 12*a*) initiates attachment to an attachment router based on storing in step 60 the tree information option parameters 66 and the prefix information option 65 into the default router list 55. As illustrated in FIG. 5, each entry 62 of the default router list 55 includes a router address field 64 specifying the corresponding subnet gateway address (e.g., 25*a*, 25*c*), the advertised address prefix 18 specified in the prefix information option 65 and the tree attribute fields 68*a* and 68*b* retrieved from the tree information option 66 of the router advertisement message 14, a router expiration timer field 70 that specifies information, including timer ID, to determine the expiration of the entry, and a tree hop timer field 72 that specifies information, including a corresponding timer ID, to delay any response to a received RA message in order to provide tree stability.

The mobile routing circuit 48 attaches in step 74 to the attachment router according to the tree topology, based on prescribed attachment techniques, for example as described in U.S. Pat. No. 7,203,175, or U.S. Patent Application Publication No. 2007/0153707 (e.g., the based on the closest match between the preferred preference in the available preference). The mobile routing circuit 48 also selects its default attachment address (e.g., 20*b*). The mobile routing circuit 48 generates in step 76 for output by the ingress interface circuit 42 an updated router advertisement message (e.g., "RA2") 14 that has an updated tree information option 66 in preference relative to the tree information option specified in the attachment router. Alternately, the mobile routing circuit 48 can output a router advertisement message 14 specifying that it is the clusterhead at a depth of zero, in the event that the mobile router is "floating" and has not yet attached to any attachment router.

The ingress interface circuit 42 can receive in step 78 sensor data messages 30 from attached sensor host nodes 11, where the sensor host nodes 11 have attached in response to detecting the router advertisement message output from the mobile router 12. The mobile routing circuit 48 can identify the received data packets as sensor data messages according to prescribed settings, for example based on the host identifier 80 of the attached sensor host node, based on a link layer (MAC) address 82, or based on other prescribed settings preconfigured within the mobile routing circuit 48. As described above, step 78 is illustrated as an example only, and need not be executed according to a particular sequence; to the contrary, step 78 preferably is executed as an asynchronous event that is independent of any other mobile router operations such that the ingress interface circuit 42 can receive sensor data messages 30 at any time.

The mobile routing circuit 48 can aggregate in step 84 the sensor data elements 32 from the received sensor data messages 30 into the locally aggregated sensor data (e.g., 36*b*), stored as statistical data and organized for example according to sensor attribute type 56. The mobile routing circuit 48 can add in step 86 the locally aggregated sensor data (e.g., 36*b*) into the neighbor advertisement message (e.g., 16*b*) to be output to the attachment router (e.g., 12*a*).

In response to the ingress interface circuit 42 detecting in step 88 reception of a neighbor advertisement message (e.g., 16*a*) from an attached mobile router (e.g., 12*d*), the mobile routing circuit 48 (e.g., of the mobile router 12*b*) can store any advertised prefixes within any network in node option 22 into the routing table circuit 50 and/or the neighbor cache circuit 52, as appropriate, and add in step 90 the address prefixes (e.g., 18*d*, 18*e*) from the routing table entries in the routing table circuit 50 to the neighbor advertisement message 16*b*. As described above with respect to step 78, reception of neighbor advertisement messages by the ingress interface circuit 42 preferably is asynchronous that is independent of any other mobile router operations.

If in step 92 the received neighbor advertisement message includes received aggregated sensor data (e.g., 36*d*), the mobile routing circuit 48 can cache the received aggregated sensor data (e.g., 36*d*) into the aggregated sensor data cache 54, and add in step 94 the locally aggregated sensor data (e.g., 36*b*) with the received aggregated sensor data (e.g., 36*d*, 36*e*) to generate the total aggregated sensor data 38 from all the available sources, including the locally aggregated sensor data 36*b*, and the received aggregated sensor data 36*d* and 36*e*, organized according to the sensor attribute type 56. The mobile routing circuit 48 can then add the total aggregated sensor data 38 to the neighbor advertisement message 16*b* in step 96, and outputs the neighbor advertisement message 16*b* in step 98.

As apparent from the foregoing, the neighbor advertisement message 16 can provide network prefix aggregation (specified within the network in node option 22) and aggregated sensor data (specified within the aggregated sensor data option 27) for a single mobile router, for example in the case of a leaf mobile router 12*d* outputting a neighbor advertisement message 16*a* specifying only locally aggregated sensor data 36*d* and its own address prefix 18*d*. Mobile routers that are closer to the clusterhead, however, can add more prefix information 18 and aggregated sensor data (e.g., 38, 36*b*, 36*d*, 36*e*), without any increase in the number of neighbor advertisement messages that need to be propagated toward the clusterhead 12*a*.

FIG. 7 illustrates an example method by the mobile router of FIG. 5 of generating and outputting updated neighbor advertisement messages, according to an example embodiment. As described previously, traffic through the mobile ad hoc network 10 can be minimized to only the events that require transmission of reachability information to maintain the tree topology of the noble ad hoc network 10, or to update any changes within the tree topology. Hence, in response to the reception of sensor data messages in step 78 as in FIG. 6, the mobile routing circuit 48 can aggregate the sensor data in step 84, as in FIG. 6. The mobile routing circuit 40 also can add the locally aggregated sensor data (e.g., 36*b*) in step 86 of FIG. 7 to the neighbor advertisement message to be transmitted to the attachment router. The mere reception of sensor data messages 30, however, does not cause the transmission of the neighbor advertisement message 16. Rather, if in step 100 the mobile routing circuit 48 (e.g., of the mobile router 12*b*) determines that no neighbor advertisement messages 16 have been received from any attached mobile router 12, the mobile routing circuit 48 determines in step 102 whether any routing table entry has been deleted from the routing table circuit 50, requiring an updated neighbor advertisement message to be transmitted to the attachment router to notify of the topology change.

If no routing table entry has been deleted from the routing table circuit 50, and if in step 104 the mobile routing circuit 48 has not chosen a new attachment router, the mobile routing circuit 48 determines in step 106 whether a sensor exception event has occurred, for example whether any sensor data element value from a received sensor data message 30, or an aggregated sensor data value (e.g., one of the aggregated values 36*b*) exceeds a prescribed data value or a prescribed statistical value. If no sensor exception event is detected in step 106, the mobile routing circuit 48 can determine in step 108 whether a prescribed neighbor advertisement wait interval has expired that necessitates transmission another neighbor advertisement message 16 (e.g., as a heartbeat message).

If no prescribed neighbor advertisement wait interval has expired, the mobile routing circuit 48 will return to step 78 of FIG. 7 without transmitting a neighbor advertisement message.

Hence, the mobile routing circuit 48 can be configured to output an updated neighbor advertisement message in step 110 only in response to one of the detected events of steps 100, 102, 104, 106, or 108, minimizing unnecessary transmission of neighbor advertisement messages in the mobile ad hoc network 10: although not illustrated in FIG. 7, and the inherent operation in the outputting of an updated neighbor advertisement message in step 110 includes purging the aggregated sensor data cache 54 by the mobile router circuit 48 to ensure that only "fresh data" (as opposed to stale data) is sent to the attachment router, and to ensure that if the mobile router 12 attaches to a new attachment router, the new attachment router does not aggregate sensor data that already has been transmitted toward the clusterhead. If preferred, the mobile router circuit 48 can be configured to output updated neighbor advertisement messages in response to events other than those specified with respect to steps 100, 102, 104, 106, or 108.

Although the aggregated sensor data in the neighbor advertisement message is illustrated is illustrated as an option field, it will be appreciated that the aggregated sensor data also can be expressed within the neighbor advertisement messages as type length value parameters implemented using extensible markup language (XML) tags.

Although the example embodiments illustrated neighbor advertisement messages specifying aggregated sensor data options with the network in node option, a neighbor advertisement message can be transmitted by a mobile router, where the neighbor advertisement includes the aggregated sensor data option without the network in node option, if preferred.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    attaching, by a mobile router, to an attachment router according to a protocol requiring establishment of a tree topology having a single clusterhead, the attaching by the mobile router based on the mobile router receiving, from the attachment router, an advertisement message specifying an attachment prefix;
    outputting by the mobile router a second advertisement message specifying availability of a prescribed address prefix used by the mobile router and distinct from the attachment prefix, and further specifying attributes of the mobile router relative to the tree topology;
    receiving by the mobile router a plurality of sensor data messages from at least one attached sensor host node, each sensor data message specifying at least one sensor data element specifying a detected sensor parameter;
    aggregating by the mobile router the sensor data elements from the sensor data messages into aggregated sensor data;
    generating and outputting by the mobile router a neighbor advertisement message to the attachment router, the neighbor advertisement message specifying the aggregated sensor data; and
    receiving by the mobile router a second neighbor advertisement message from an attached mobile router having attached to the mobile router, the second neighbor advertisement message specifying second aggregated sensor data;
    the aggregating including aggregating the sensor data elements with the second aggregated sensor data received from the attached mobile router to form the aggregated sensor data.

2. The method of claim 1, wherein the neighbor advertisement message further specifies that the prescribed address prefix used by the mobile router is reachable via a default attachment address having been selected by the mobile router, the default attachment address within an address space of the attachment prefix.

3. The method of claim 2, wherein:
    the second neighbor advertisement message further specifies that a specified address prefix used by the attached mobile router is reachable via a second attachment address having been selected by the attached mobile router, the second attachment address within the address space of the prescribed address prefix;
    the generating and outputting including specifying within the neighbor advertisement message that the specified address prefix used by the attached mobile router is reachable via the default attachment address of the mobile router.

4. The method of claim 3, wherein:
    each of the detected sensor parameters specified in the respective sensor data elements specify data according to one of a plurality of sensor attribute types;
    the aggregating includes aggregating the sensor data elements and the second aggregated sensor data according to the sensor attribute types, the aggregated sensor data specified in the neighbor advertisement message as aggregated sensor parameters according to the respective sensorattribute types.

5. The method of claim 3, wherein the generating includes specifying within the neighbor advertisement message:
    the aggregated sensor data,
    the second aggregated sensor data with a corresponding identifier identifying the second aggregated sensor data is from the attached mobile router, and the aggregation of the sensor data elements having been received from the at least one attached sensor host node with a corresponding identifier identifying the aggregation of the sensor data elements is from the mobile router.

6. The method of claim 1, wherein:
each of the detected sensor parameters specified in the respective sensor data elements specify data according to one of a plurality of sensor attribute types;
the aggregating includes aggregating the sensor data elements according to the sensor attribute types, the aggregated sensor data is specified in the neighbor advertisement message as aggregated sensor parameters according to the respective sensor attribute types.

7. The method of claim 1, further comprising outputting by the mobile router an updated neighbor advertisement message to the attachment router only in response to one of:
a third neighbor advertisement message received by the mobile router from any attached mobile router having attached to the mobile router;
a deletion of a routing table entry within the mobile router;
the mobile router having attached to a second attachment router based on a corresponding received second advertisement message from the second attachment router and that specifies a second attachment prefix distinct from the attachment prefix and the prescribed address prefix used by the mobile router;
expiration of a prescribed neighbor advertisement waiting time interval; or
a prescribed event based on the mobile router detecting one of the sensor data elements or the aggregated sensor data exceeding a prescribed threshold.

8. The method of claim 1, further comprising generating, by the mobile router, statistical data describing at least a portion of the aggregated sensor data, the generating and outputting including inserting within the neighbor advertisement message the statistical data.

9. An apparatus comprising:
an Internet protocol (IP) interface circuit configured for receiving an advertisement message that specifies an attachment prefix from an attachment router, the IP interface circuit further configured for outputting a second advertisement message specifying availability of a prescribed address prefix used by the apparatus and distinct from the attachment prefix, the IP interface circuit further configured for receiving a plurality of sensor data messages from at least one attached sensor host node, each sensor data message specifying at least one sensor data element specifying a detected sensor parameter; and
a second circuit configured for attaching to the attachment router as a mobile router and according to a protocol requiring establishment of a tree topology having a single clusterhead, the second circuit configured for generating the second advertisement message to specify attributes of the apparatus relative to the tree topology, the second circuit further configured for generating the second advertisement message in response to attachment to the attachment router, the second circuit further configured for aggregating the sensor data elements from the sensor data messages into aggregated sensor data, and generating, for output by the IP interface circuit, a neighbor advertisement message to the attachment router and that specifies the aggregated sensor data wherein:
the IP interface circuit is configured for receiving a second neighbor advertisement message from an attached mobile router having attached to the apparatus, the second neighbor advertisement message specifying second aggregated sensor data;
the second circuit is configured for aggregating the sensor data elements with the second aggregated sensor data received from the attached mobile router to form the aggregated sensor data.

10. The apparatus of claim 9, wherein the neighbor advertisement message further specifies that the prescribed address prefix used by the apparatus is reachable via a default attachment address having been selected by the second circuit, the default attachment address within an address space of the attachment prefix.

11. The apparatus of claim 10, wherein:
the second neighbor advertisement message further specifies that a specified address prefix used by the attached mobile router is reachable via a second attachment address having been selected by the attached mobile router, the second attachment address within the address space of the prescribed address prefix;
the second circuit is configured for specifying within the neighbor advertisement message that the specified address prefix used by the attached mobile router is reachable via the default attachment address of the apparatus.

12. The apparatus of claim 11, wherein:
each of the detected sensor parameters specified in the respective sensor data elements specify data according to one of a plurality of sensor attribute types;
the second circuit is configured for aggregating the sensor data elements and the second aggregated sensor data according to the sensor attribute types, the aggregated sensor data specified in the neighbor advertisement message as aggregated sensor parameters according to the respective sensor attribute types.

13. The apparatus of claim 11, wherein the second circuit is configured for specifying within the neighbor advertisement message:
the aggregated sensor data,
the second aggregated sensor data with a corresponding identifier identifying the second aggregated sensor data is from the attached mobile router, and
the aggregation of the sensor data elements having been received from the at least one attached sensor host node with a corresponding identifier identifying the aggregation of the sensor data elements is from the apparatus.

14. The apparatus of claim 9, wherein:
each of the detected sensor parameters specified in the respective sensor data elements specify data according to one of a plurality of sensor attribute types;
the second circuit is configured for aggregating the sensor data elements according to the sensor attribute types, the aggregated sensor data specified in the neighbor advertisement message as aggregated sensor parameters according to the respective sensor attribute types.

15. The apparatus of claim 9, wherein the second circuit is configured for generating, for output by the IP interface circuit to the attachment router, an updated neighbor advertisement message only in response to one of:
a third neighbor advertisement message received by IP interface circuit from any attached mobile router having attached to the apparatus;
a deletion of a routing table entry within the apparatus by the second circuit;
the second circuit having attached to a second attachment router based on a corresponding received second advertisement message from the second attachment router and that specifies a second attachment prefix distinct from the attachment prefix and the prescribed address prefix used by the apparatus;
expiration of a prescribed neighbor advertisement waiting time interval; or
a prescribed event based on the second circuit detecting one of the sensor data elements or the aggregated sensor data exceeding a prescribed threshold.

16. The apparatus of claim 9, wherein the second circuit is configured for generating statistical data describing at least a portion of the aggregated sensor data, the second circuit further configured for inserting within the neighbor advertisement message the statistical data.

17. An apparatus comprising:

means for receiving an advertisement message that specifies an attachment prefix from an attachment router, the means for receiving further configured for outputting a second advertisement message specifying availability of a prescribed address prefix used by the apparatus and distinct from the attachment prefix, the means for receiving further configured for receiving a plurality of sensor data messages from at least one attached sensor host node, each sensor data message specifying at least one sensor data element specifying a detected sensor parameter; and means for attaching to the attachment router according to a protocol requiring establishment of a tree topology having a single clusterhead, the means for attaching configured for generating the second advertisement message to specify attributes of the apparatus relative to the tree topology, the means for attaching further configured for generating the second advertisement message in response to attachment to the attachment router, the means for attaching further configured for aggregating the sensor data elements from the sensor data messages into aggregated sensor data, and generating, for output by the means for receiving, a neighbor advertisement message to the attachment router and that specifies the aggregated sensor data, wherein:

the means for receiving is configured for receiving a second neighbor advertisement message from an attached mobile router having attached to the apparatus, the second neighbor advertisement message specifying second aggregated sensor data;

the means for attaching configured for aggregating the sensor data elements with the second aggregated sensor data received from the attached mobile router to form the aggregated sensor data.

\* \* \* \* \*